US011822557B2

(12) United States Patent
Jackson et al.

(10) Patent No.: US 11,822,557 B2
(45) Date of Patent: Nov. 21, 2023

(54) METHOD AND SYSTEM TO FACILITATE ACCESS TO AND USE OF CONTEXTUAL IDENTITY INFORMATION DURING LAW ENFORCEMENT ENCOUNTERS FOR MINIMIZING CONFRONTATIONAL TENSIONS

(71) Applicant: QUICK RESPONSE, INC., Cordova, TN (US)

(72) Inventors: Mary D. Jackson, Cordova, TN (US); Brenton Mohair, Olive Branch, MS (US); Brian Simons, Medina, MN (US); Damon Willis, Smyrna, GA (US); Chapelle Riggins, Cordova, TN (US)

(73) Assignee: QUICK RESPONSE, INC., Cordova, TN (US)

( * ) Notice: Subject to any disclaimer, the term of this patent is extended or adjusted under 35 U.S.C. 154(b) by 0 days.

(21) Appl. No.: 17/717,797

(22) Filed: May 4, 2022

(65) Prior Publication Data
US 2022/0253445 A1  Aug. 11, 2022

Related U.S. Application Data

(63) Continuation-in-part of application No. 17/566,304, filed on Dec. 30, 2021, now abandoned.
(Continued)

(51) Int. Cl.
*G06F 16/00* (2019.01)
*G06F 16/2457* (2019.01)
(Continued)

(52) U.S. Cl.
CPC ...... *G06F 16/24573* (2019.01); *G06F 16/248* (2019.01); *G06F 16/252* (2019.01); *G06Q 50/265* (2013.01)

(58) Field of Classification Search
CPC ............ G06F 16/24573; G06F 16/248; G06F 16/252; G06Q 50/265
(Continued)

(56) References Cited

U.S. PATENT DOCUMENTS 9,928,735 B2 * 3/2018 Wang ............... G08G 1/096775
2009/0096579 A1 * 4/2009 Arcas .................... G06Q 10/10
340/5.86
(Continued)

*Primary Examiner* — Michelle N Owyang
(74) *Attorney, Agent, or Firm* — HULSEY P.C.

(57) ABSTRACT

A system and a method facilitating access to and use of contextual identity information during law enforcement encounters for minimizing confrontational tensions are disclosed. A user updates information corresponding to a user, his/her associates, and a vehicle on a government server and an insurance server. A law enforcement official uses a law enforcement device to access the government server, the insurance server, and a law enforcement server. The law enforcement official accesses the government server, the law enforcement server, and the insurance server to verify the identification of the user and the vehicle. The system allows the law enforcement official to have required information on the law enforcement device to verify the identification of the user and the vehicle. The law enforcement official verifies the identification at ease thereby reducing potential hostile situations with the user.

20 Claims, 13 Drawing Sheets

Related U.S. Application Data

(60) Provisional application No. 63/132,422, filed on Dec. 30, 2020.

(51) Int. Cl.
    *G06F 16/248*    (2019.01)
    *G06F 16/25*     (2019.01)
    *G06Q 50/26*    (2012.01)

(58) Field of Classification Search
    USPC .................................................. 707/600–899
    See application file for complete search history.

(56) References Cited

U.S. PATENT DOCUMENTS

| | | | |
|---|---|---|---|
| 2015/0106289 A1* | 4/2015 | Basir | G06Q 50/265 |
| | | | 705/325 |
| 2016/0358017 A1* | 12/2016 | Guzik | G06F 3/048 |
| 2018/0018869 A1* | 1/2018 | Ahmad | G06V 20/63 |
| 2018/0276700 A1* | 9/2018 | Wang | G06Q 30/0217 |
| 2019/0304297 A1* | 10/2019 | Burley, IV | G08G 1/04 |
| 2021/0073529 A1* | 3/2021 | Thompson | G08G 1/012 |

\* cited by examiner

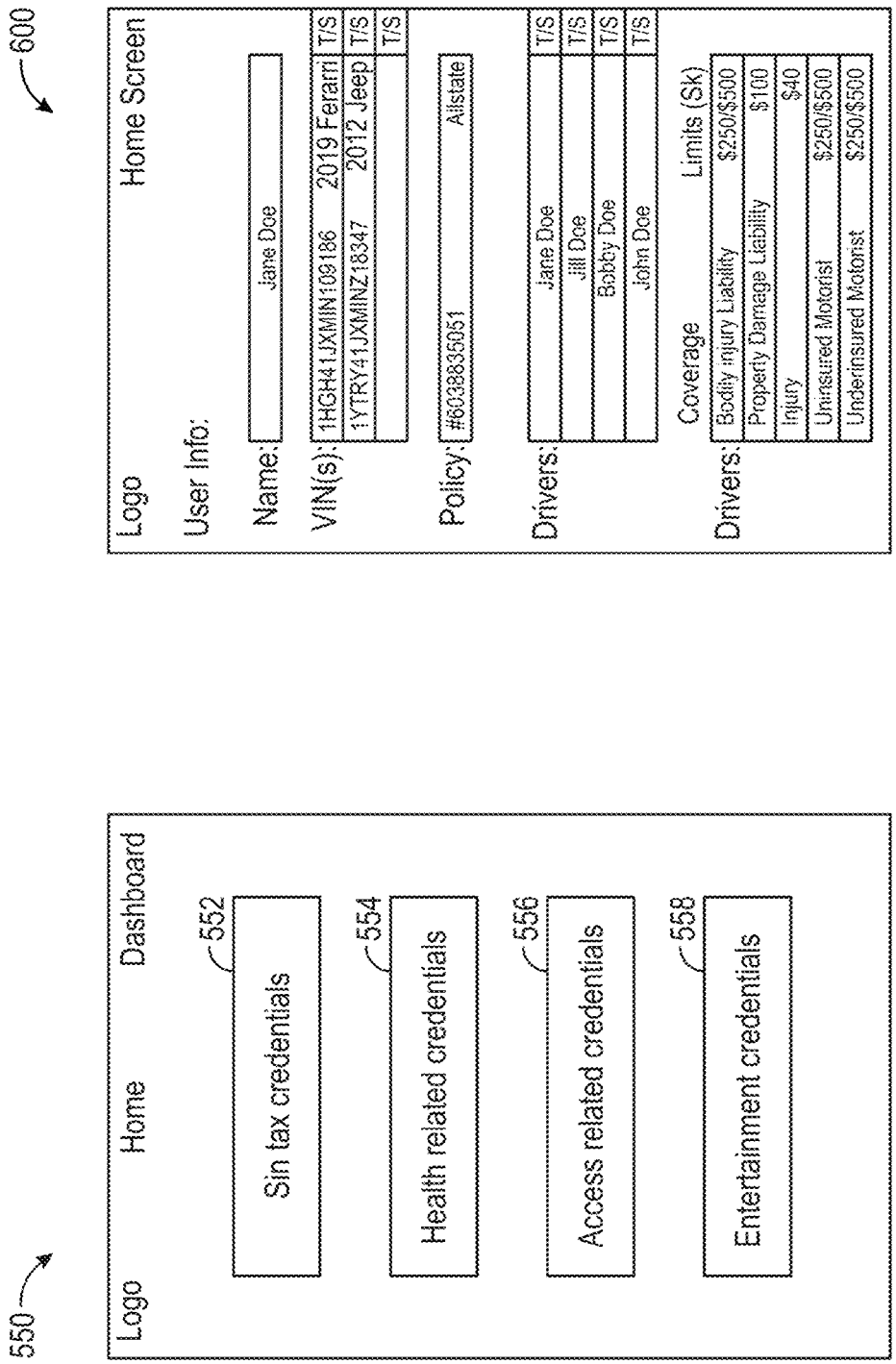

Driver Scorecard 750

User Info:

| Name | Bobby Doe | |
|------|-----------|---|
| Policy | #6038835051 | Allstate |
| VIN(S) | 1YTRY41XMIN218347 | 2012 Jeep |

Summary

| Distance | 436.8 | High RPM | 0 |
|----------|-------|----------|---|
| Stops | 15 | Low Battery | 0 |
| Avg Trip | 29 | High Coolant | 0 |
| Max Speed | 80 | Speeding | 7 |
| Fuel | 18.4 | Rapid Accel | 8 |
| High RPM | 0 | Harsh Brake | 3 |

FIG. 9

Vehicle Tracking 700

User Info:

| Name | Bobby Doe | |
|------|-----------|---|
| Policy | #6038835051 | Allstate |
| VIN(S) | 1YTRY41XMIN218347 | 2012 Jeep |

| Logo | User Screen |

Video Interface Chat

Accept video chat

Infraction Info:

| | |
|---|---|
| Infraction: | Speeding |
| Description: | 40mph in a 25mph zone |
| Location: | Main St and Elm St |
| O cer Name: | Lisa Jones |
| Court Date: | 15/06/22 |

Click here to see information about resolving this citation remotely

Immediate Resolution:

| | |
|---|---|
| Citizen Rights: | Click here to read your rights |
| Declaration: | Do you accept this citation? |
| | Yes ☐    No ☐ |

| | Resident | |
|---|---|---|
| Logo | | |

Primary Resident
Name: Bobby and Jane Doe

| Address | 1415 Safeway Road | | T/S |
|---|---|---|---|
| | Anytown, CA | 38016 | T/S |
| R Weapon | 9MM/Glock | Jane Doe | 2010 |

Policy: #6038835051 Allstate

| Residents | Jane Doe | T/S |
|---|---|---|
| | Jill Doe | T/S |
| | Bobby Doe | T/S |
| | John Doe | T/S |

| | Coverage | Limits ($k) |
|---|---|---|
| Residents | Bodily Injury Liability | $250/$500 |
| | Property Damange Liability | $100 |
| | Xxxxxx | $40** |
| | Xxxxxx | $250/$500 |
| | Xxxxxxx | $250/$500 |

| Logo | | User Screen |
|---|---|---|

Image Capture

| Capture Image | Activate Voice Recorder |
|---|---|

Incident Info:

| Incident Info: | Rear ended |
|---:|---|
| Location: | Main St and Elm St |
| Other Party Name: | Lisa Jones |
| Incident Date and Time: | 6/15/22 1:32 PM |

Click here to see information about admitting responsibility to this incident

Immediate Resolution:

| Citizen Rights: | Click here to read your rights |
|---:|---|
| Declaration: | Do you accept resposibility for this incident? <br> Yes ☐     No ☐ |
| Declaration: | Did the other party accept resposibility for this incident? <br> Yes ☐     No ☐ |

FIG. 14

METHOD AND SYSTEM TO FACILITATE ACCESS TO AND USE OF CONTEXTUAL IDENTITY INFORMATION DURING LAW ENFORCEMENT ENCOUNTERS FOR MINIMIZING CONFRONTATIONAL TENSIONS

RELATED APPLICATIONS AND CLAIM FOR PRIORITY

The present application claims priority from U.S. Provisional Patent Application Ser. No. 63/132,422, titled "METHOD AND SYSTEM TO FACILITATE ACCESS TO AND USE OF CONTEXTUAL IDENTITY INFORMATION DURING LAW ENFORCEMENT ENCOUNTERS FOR MINIMIZING CONFRONTATIONAL TENSIONS," filed Dec. 30, 2020, which is incorporated herein by its entirety and referenced thereto.

The present application claims priority from U.S. Non-Provisional patent application Ser. No. 17/566,304, titled "METHOD AND SYSTEM TO FACILITATE ACCESS TO AND USE OF CONTEXTUAL IDENTITY INFORMATION DURING LAW ENFORCEMENT ENCOUNTERS FOR MINIMIZING CONFRONTATIONAL TENSIONS," filed Dec. 30, 2021, which is incorporated herein by its entirety and referenced thereto.

FIELD OF INVENTION

The present invention generally relates to verifying the identity of users during law enforcement encounters. More specifically, the present invention relates to a system and method facilitating access to law enforcement officers to access contextual information of users during law enforcement encounters, first responders, and civilian encounters for minimizing confrontational tensions with the users.

BACKGROUND OF INVENTION

Law enforcement officers such as police often face dangerous situations in maintaining law and order. At times, law enforcement officers face dangerous situations due to a lack of appropriate information. For example, consider that a law enforcement officer stops a vehicle at the side of the road to verify the identification of a driver and/or the vehicle. Typically, the law enforcement officer verifies the vehicle identification using the vehicle's license plate number. However, there is no mechanism available that allows the law enforcement officer to verify who is actually driving the vehicle or what is happening in the vehicle until the law enforcement officer approaches the vehicle. Once the law enforcement officer approaches the vehicle, a user or driver may panic due to uncertainty on adverse actions of the law enforcement officer. The law enforcement officer too may act suspicious and proceed cautiously. The above may lead to poor relations between the law enforcement officer and the driver.

Further, the law enforcement officer may confront the driver and use force to arrest the driver. Further, the law enforcement officer may abuse and use racial slurs to intimidate the driver. Many such situations quickly get escalated and result in the law enforcement officer fatally shooting down the driver, or occupants fatally shooting the law enforcement officer.

In order to reduce such situations, authorities install body-worn cameras to monitor the behaviour of law enforcement officers and drivers. However, they do not prevent or minimize confrontational tensions between law enforcement officers and drivers.

Therefore, there is a need for a system facilitating access to law enforcement officers to access contextual information of users during law enforcement encounters for minimizing confrontational tensions with the users.

SUMMARY

It is an object of the present invention to provide a system facilitating access to law enforcement officers to access contextual information of users during law enforcement encounters for minimizing confrontational tensions with the users and that avoids the drawback of known techniques.

It is another object of the present invention to provide a system linked to law enforcement, insurance, and government databases or servers to provide instant identification of the user(s) of a vehicle to minimize confrontational tensions between a law enforcement officer and a user, and also provide an option to disposition traffic stops without leaving the vehicle.

It is yet another object of the present invention to provide an option to exchange data from civilians involved in non-injury and non-emergency accidents to exchange personal information, auto dealerships to register temporary tags, rental car companies to register rented vehicles with renters' information, civilians to capture cars sold by owner information in the system and credentialing. Smart watch or panic capabilities.

In order to achieve one or more objects, the present invention provides a system that allows a user or driver to update his, and his associate's information and vehicle information with a government server and an insurance server. User information and vehicle information such as department of motor vehicles (DMV) information, vehicle registration details, insurance details, and law enforcement information is updated in real-time with the government server and the insurance server. A law enforcement officer uses a law enforcement device to access the government server, the insurance server, and a law enforcement server. Specifically, the law enforcement officer uses the law enforcement device when he/she pulls over the user at the side of the road to verify the identification of the user. The law enforcement officer accesses information of the user and vehicle to identify the user.

In one advantageous feature of the present invention, the system provides the information to the law enforcement officer and allows to reduce potentially hostile situations, by putting the law enforcement official at ease. The system provides complete information about the user to the law enforcement official and helps to reduce the initial confrontational tension between the law enforcement officer and the user. This results in the user or driver likelihood of putting the law enforcement official in a potentially dangerous situation. Further, this causes the law enforcement official to be less likely to harm the user/driver/resident to be less likely to harm law enforcement official.

Features and advantages of the invention hereof will become more apparent in light of the following detailed description of selected embodiments, as illustrated in the accompanying FIGUREs. As will be realised, the invention disclosed is capable of modifications in various respects, all without departing from the scope of the invention. Accordingly, the drawings and the description are to be regarded as illustrative in nature.

BRIEF DESCRIPTION OF THE DRAWINGS

Further features and advantages of the present invention will become apparent from the following detailed description, taken in combination with the appended drawings, in which:

FIGS. 4, 5, 6, 7, 8, and 9 illustrate exemplary interfaces presented on a client device, in accordance with one embodiment of the invention;

FIGS. 10 and 11 illustrate exemplary interfaces presented on a client device or a law enforcement device, in accordance with one embodiment of the invention;

FIGS. 12 and 13 illustrate exemplary interfaces presented on user device for providing resident information, in accordance with one embodiment of the invention;

FIG. 14 illustrates exemplary interface presented to the user device when involved in an accident, in accordance with one embodiment of the invention;

It will be noted that throughout the appended drawings, like features are identified by like reference numerals.

DETAILED DESCRIPTION OF THE EMBODIMENTS

Before the present features and working principle of a system for facilitating access to and use of contextual identity information during law enforcement encounters for minimizing confrontational tensions is described, it is to be understood that this invention is not limited to the particular system as described, since it may vary within the specification indicated. Various features for facilitating access to and use of contextual identity information during law enforcement encounters for minimizing confrontational tensions might be provided by introducing variations within the components/subcomponents disclosed herein. It is also to be understood that the terminology used in the description is for the purpose of describing the particular versions or embodiments only, and is not intended to limit the scope of the present invention, which will be limited only by the appended claims. The words "comprising," "having," "containing," and "including," and other forms thereof, are intended to be equivalent in meaning and be open-ended in that an item or items following any one of these words is not meant to be an exhaustive listing of such item or items, or meant to be limited to only the listed item or items.

It should be understood that the present invention describes a system and method of facilitating access to and use of contextual identity information during law enforcement encounters for minimizing confrontational tensions, access to and use of contextual identity information during law enforcement encounters for minimizing confrontational tensions. The system provides the information to the law enforcement officer and allows to reduce potentially hostile situations, by putting the law enforcement official at ease. The system provides complete information about the users to the law enforcement official and helps to reduce the initial confrontational tension between the law enforcement officer and the users.

Various features and embodiments of the system for facilitating access to and use of contextual identity information during law enforcement encounters for minimizing confrontational tensions are explained in conjunction with the description of FIGS. 1-16.

Figure 1:
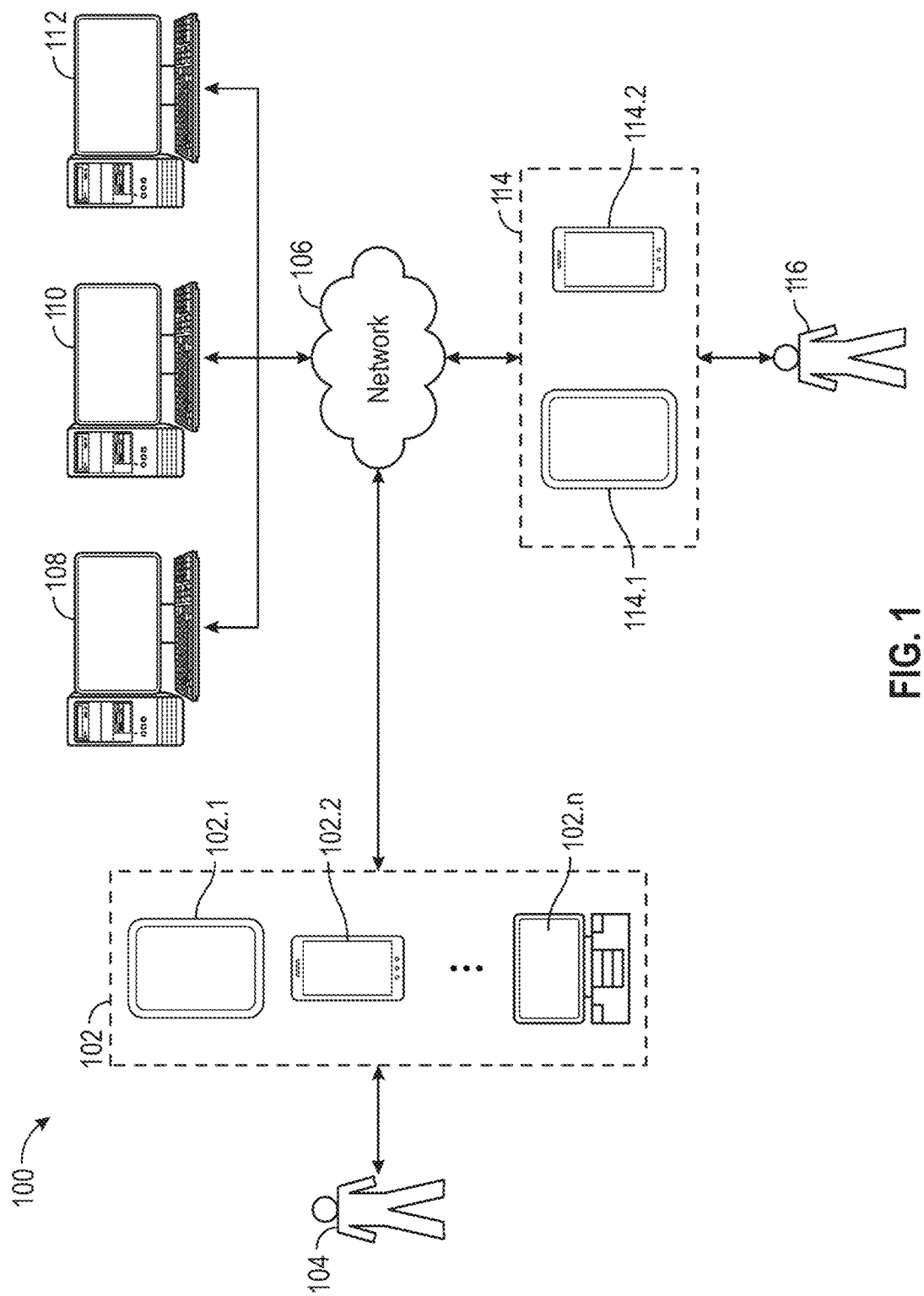
FIG. 1 illustrates an exemplary network communications system, in accordance with one embodiment of the present invention.

The present invention discloses a system for facilitating access to and use of contextual identity information during law enforcement encounters for minimizing confrontational tensions. The system may be realised in a network communications system. FIG. 1 shows a high-level block diagram of an exemplary network communications system 100, in accordance with one embodiment of the present invention. For ease of reference, network communications system 100 is referred to as system 100 throughout the description. System 100 includes one or more client devices such as client device 102.1, client device 102.2 client device 102.n, collectively referred as client devices or simply client device 102. Client device 102 indicates an electronic device such as a mobile device, a personal digital assistant, a laptop computer, a tablet computer, a desktop computer, a smart watch, etc. In the present invention, user 104 of a vehicle operates client device 102. Here, user 104 indicates an individual who is an owner of a vehicle or another individual authorized by the owner to operate the vehicle. For example, owner 104 operates client device 102.1 and his daughter 104 operates client device 102.2. In one example, user 104 indicates a car dealership or car rental company who registers themselves as users and authorizes their customers as authorized users to operate a vehicle. Here, the car rental company issues a Quick Response code (QR) tag containing the customer's information such as name, age, insurance information, license details, etc. The car rental company updates the sales and insurance information including liability information in case of damage or loss of vehicle during the period of vehicle rental. The vehicle includes, but limited to, a motorized and a non-motorized vehicle. Further, the vehicle includes a land-based vehicle such as a car, truck, etc., or a water-based vehicle such as a boat, a personal watercraft, etc.

Figure 2:
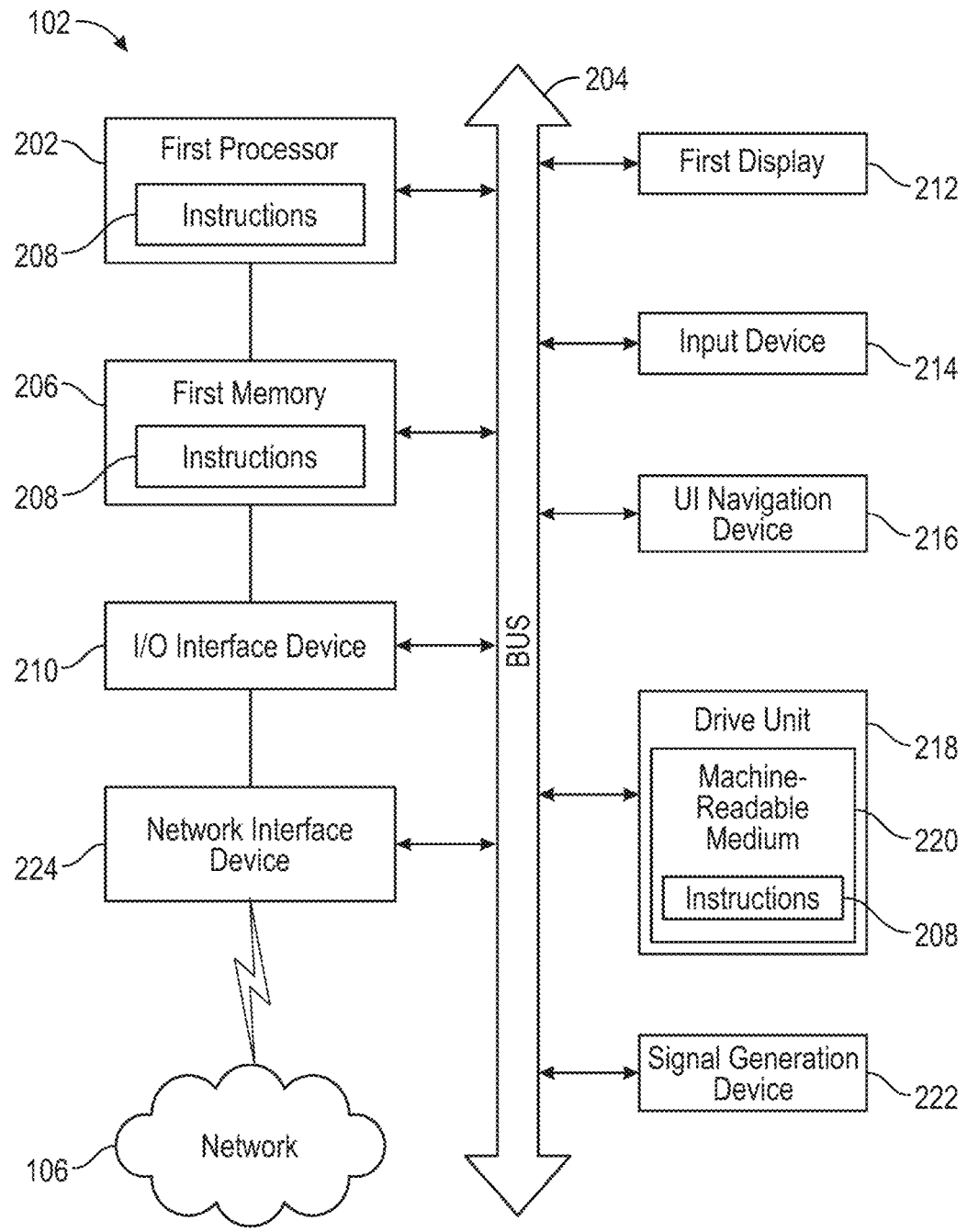
FIG. 2 illustrates a diagrammatic representation of the system, in accordance with one embodiment of the present invention.

FIG. 2 shows a diagrammatic representation of client device 102, in accordance with one embodiment of the present invention. Client device 102 encompasses first processor 202 (e.g., a central processing unit (CPU), a graphics processing unit (GPU), or both). First processor 202 electrically couples by a data bus 204 to a first memory 206. First memory 206 includes volatile memory and/or non-volatile memory. Preferably, first memory 206 stores instructions or software program 208 that interact with the other devices in client device 102 and/or system 100 as described below. In one implementation, first processor 202 executes instructions 208 stored in first memory 206 in any suitable manner. In one implementation, first memory 206 stores digital data indicative of documents, files, programs, web pages, etc. retrieved from one of host device 108, server 110, and input device 214.

Client device 102 further includes first display 212 (e.g., a liquid crystal display (LCD) or a cathode ray tube (CRT)). Client device 102 includes input device (e.g., a keyboard) and/or touchscreen 214, user interface (UI) navigation device 216 (e.g., a mouse), drive unit 218, signal generation device 222 (e.g., a speaker), and a network interface device 224.

Drive unit 218 includes machine-readable medium 220 on which one or more sets of instructions and data structures (e.g., software 208) is stored. It should be understood that the term "machine-readable medium" includes a single medium or multiple medium (e.g., a centralised or distributed database, and/or associated caches and servers) that stores one or more sets of instructions. The term "machine-readable medium" also includes any medium that is capable of storing, encoding, or carrying a set of instructions for execution by the machine and that cause the machine to perform any one or more of the methodologies of the present invention, or that is capable of storing, encoding or carrying data structures utilised by or associated with such a set of instructions. The term "machine-readable medium" accordingly includes, but not be limited to, solid-state memories, optical and magnetic media, and carrier wave signals.

Instructions 208 reside, completely or at least partially, within first memory 206 and/or within first processor 202 during execution thereof by client device 102. Network interface device 224 transmits or receives instructions 208 over network 106 utilising any one of a number of well-known transfer protocols.

Network 106 includes a wireless network, a wired network or a combination thereof. Network 106 can be implemented as one of the different types of networks, such as intranet, local area network (LAN), wide area network (WAN), the internet, and the like. Network 106 implements as a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, network 106 includes a variety of network devices, including routers, bridges, servers, computing devices, storage devices, and the like.

Client device 102 communicates with government server 108, law enforcement server 110, and insurance server 112. In one implementation, government server 108 indicates a server or database owned and operated by county, city, state, or federal government. Government server 108 stores personal details and/or social security number to identify and maintain records of user(s) 104. In one example, government server 108 receives and stores data from a department of motor vehicles (DMV) (from local, state, and federal databases). Further, government server 108 stores vehicle registration details. Law enforcement server 110 includes a server or database operated by a law enforcement authority such as local police, federal police, department of justice, etc. Law enforcement server 110 stores crime records, traffic offences, law violation records, etc. Law enforcement server 110 receives information from a variety of sources including, but not limited to, local police, federal police, department of justice, people making distress calls or reporting a crime/grievance by calling 911, etc.

Insurance server 112 indicates a server or database operated by a government or privately owned organization. Insurance server 112 stores information corresponding to the insurance obtained by the user and/or for the vehicle. Insurance server 112 stores information such as the name of the insurer, identification details of the vehicle, validity i.e., proof of the insurance, health information (medical conditions, images of medicines, prescription, etc) of user 104 and other authorized users, etc. For example, in the event of a non-injury traffic accident or occurrence, user 104 scans or takes a picture of driver's license and insurance car, pictures of damages, upload to insurance server 112. Here, insurance server 112 generates an incident number. Each of government server 108, law enforcement server 110 accesses insurance server 112 and gets information of non-emergency accident to generate a police report. The police report is formatted such that user 104 may also customize depending on the need. In addition, the police report is used for non-emergency calls/reports for dwellings/events such as government buildings, concerts, sporting events, office buildings, etc.

In addition, client device 102 includes a panic button. User 104 activates the panic button in the event of distress. Once activated, client device 102 transmits location information to one of government server 108 and law enforcement server 110. Additionally, user 104 records a voice message and transmits to one of government server 108 and law enforcement server 110. For example, the location information is transmitted to a jurisdictional police station. A law enforcement officer 116 is alerted and is advised to visit the location to take required action.

Each of government server 108, law enforcement server 110, and insurance server 112 includes an electronic device such as a mobile device, a personal digital assistant, a laptop computer, a tablet computer, a desktop computer, etc. Each of government server 108, law enforcement server 110, and insurance server 112 store one or more of a plurality of files, programs, databases, and/or web pages in one or more memories for use by client device(s) 102. A person skilled in the art appreciates that each of government server 108, law enforcement server 110, and insurance server 112 may be configured according to its particular operating system, applications, memory, hardware, etc., and may provide various options for managing the execution of the programs and applications, as well as various administrative tasks. In one implementation, each of government server 108, law enforcement server 110, and insurance server 112 are operated by separate and distinct entities that interact together according to some agreed-upon protocol. In another embodiment, each of government server 108, law enforcement server 110, and insurance server 112 are operated by the same entity.

Further, one or more law enforcement personnel operate law enforcement device 114.1, law enforcement device 114.12, collectively referred to as law enforcement device 114. Law enforcement device 114 indicates an electronic device such as a mobile device, a personal digital assistant, a laptop computer, a tablet computer, a desktop computer, etc. In the current embodiment, law enforcement officer 116 e.g., a police officer operates law enforcement device 114.

The present description is explained considering that client device 102 updates information corresponding to user 104 and his vehicle to each of government server 108, law enforcement server 110, and insurance server 112. Government server 108, law enforcement server 110, and insurance server 112 store the information and allow law enforcement officer 116 to access the information using law enforcement device 114.

Figure 3:
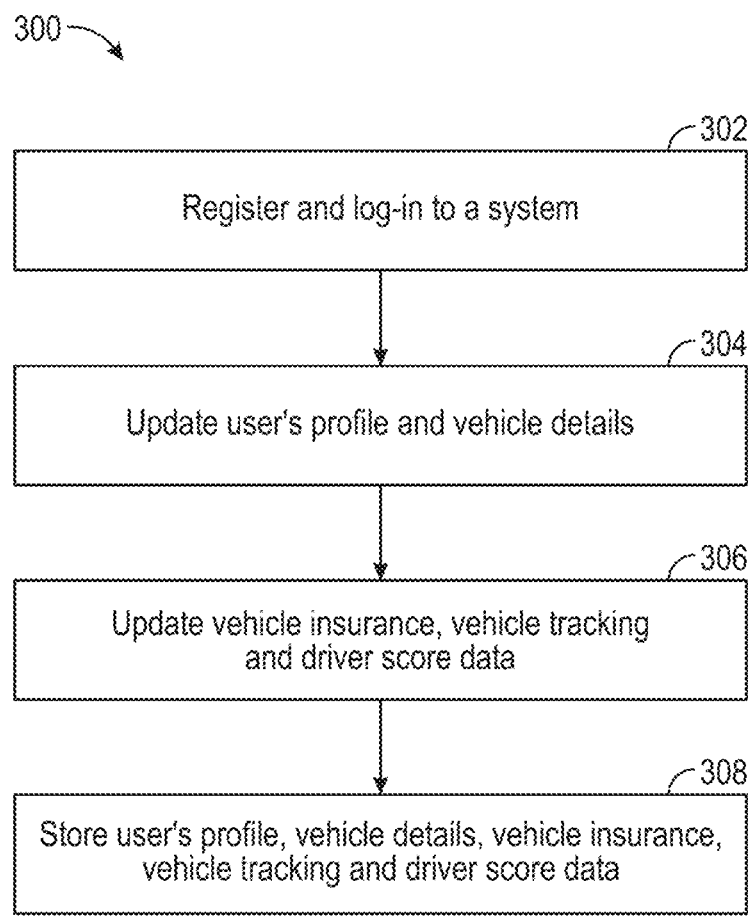
FIG. 3 illustrates a method of updating details of the user and the vehicle at government server, law enforcement server, and insurance server, in accordance with one embodiment of the invention.

FIG. 3 illustrates method 300 of updating details of user 104 and the vehicle at government server 108, law enforcement server 110, and insurance server 112, in accordance with one exemplary embodiment of the present invention. The order in which method 300 is described should not be construed as a limitation, and any number of the described method blocks can be combined in any order to implement method 300 or alternate methods. Additionally, individual blocks may be deleted from method 300 without departing from the spirit and scope of the invention described herein. Furthermore, method 300 can be implemented in any suitable hardware, software, firmware, or combination thereof. However, for ease of explanation, in the embodiments described below, method 300 may be implemented using the above-described system 100. Method 300 is explained in conjunction with exemplary interfaces illustrated in FIGS. 4 through 8.

Figures 4, 5:
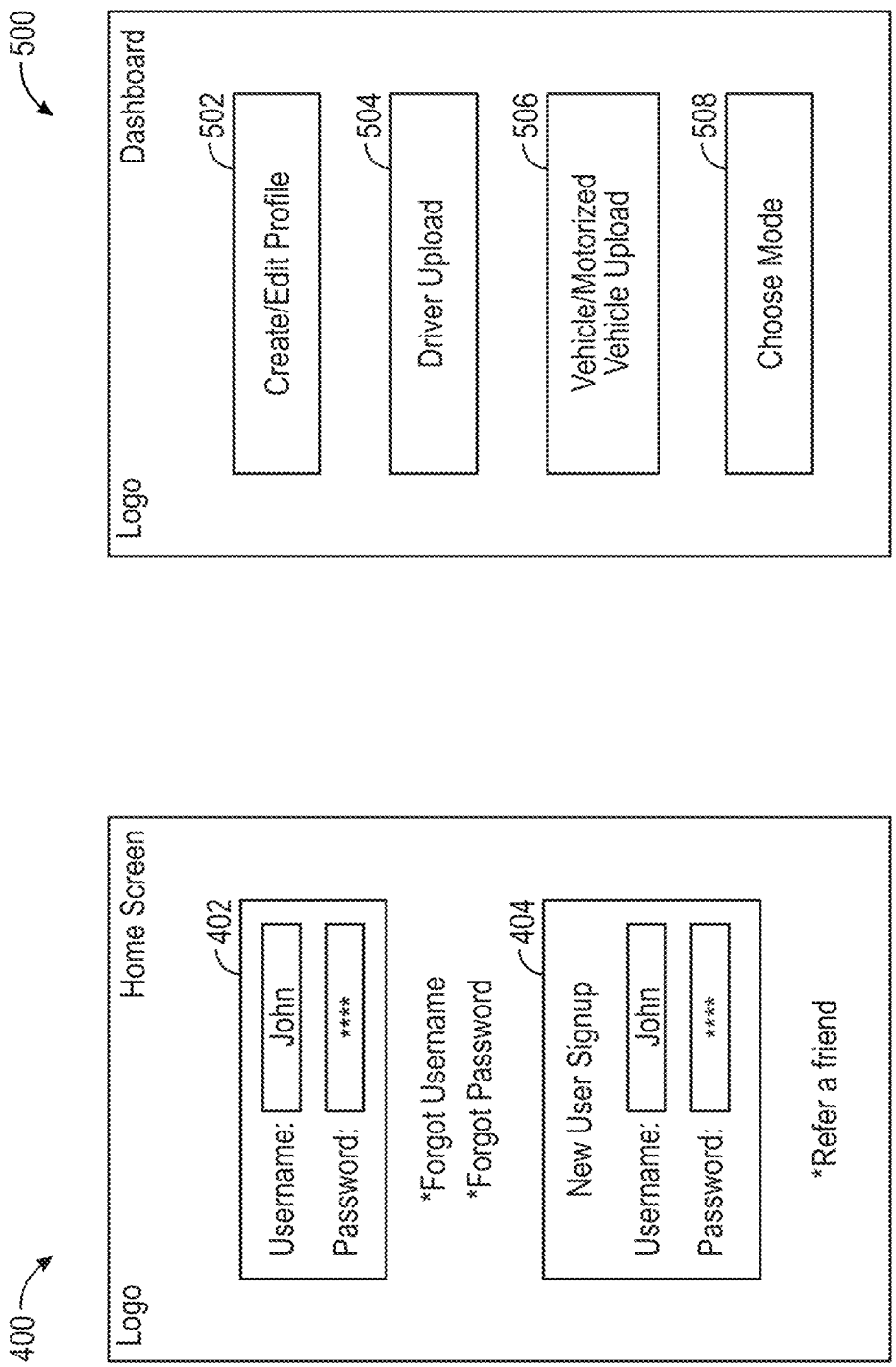

A person skilled in the art understands that client device 102 incorporates an application or specifically configured program to communicate with each of government server 108 and insurance server 112. In order to provide details of user 14 and his/her vehicle details to government server 108 and insurance server 112, at first, the user registers (step 302) with each of government server 108 and insurance server 112. FIG. 4 illustrates an exemplary interface 400 presented to user 104 on client device 102 sign-in or sign-up with government server 108 and insurance server 112. Interface 400 includes a first section 402 and second section 404. If user 102 is already registered with government server 108 and insurance server 112, then first section 402 prompts user 104 to input his username and password. If user 104 is not registered, then client device 102 prompts user 104 to sign up or register by providing his name and password in second section 402. After registering, client device 102 prompts user 104 to provide his/her details and vehicle details.

FIG. 5 shows an exemplary interface 500 presented to user 104 on client device 102 for providing his/her details and vehicle details (step 304). Interface 500 includes first section 502, second section 504, third section 506, and fourth section 508. First section 502 presents an option for a user to create or edit a profile of himself or for other users who will be using the vehicle. For example, consider user 104 is a father. As such, user 104 creates a profile for himself. Further, user 104 creates profiles for other users i.e., family members or friends by providing their names and other identification details. Second section 504 presents an option for user 104 to provide details (e.g., personal details) of himself or others who are authorized to drive his vehicle. For example, the personal details include, but not limited to, driver's license information, height, weight, hair color, eye color, email address, contact phone number, etc. Third section 506 presents an option to provide details of the vehicle. For example, consider user 104 has a Jeep™. For the vehicle, user 104 provides vehicle details such as make, model, chassis number, number plate, insurance provider name, policy number, policy coverage, etc. In one example, user 104 provides information corresponding to licenses and permits for hunting, fishing, camping; licenses, permits, and identification information for outdoor activities; licenses, permits, and identification information for people and pets. Fourth section 508 presents different modes in which user 104 can operate application and/or client device 102.

In addition, user 104 provides additional information. FIG. 6 shows an exemplary interface 550 presented to user 104 on client device 102 for providing additional information (step 304). Interface 550 includes first section 552, second section 554, third section 556, and fourth section 558. First section 552 presents an option for user 104 to provide sin tax credentials. The sin tax credentials include, but not limited to, drinking, smoking and other habits of user 104. Second section 554 presents an option to provide health related credentials. Health related credentials include, but not limited to, Coronavirus vaccine status, specific health conditions of user 104, etc. Third section 556 presents an option to provide access related credentials of user 104. The access related credentials, include, but not limited to, government security access, exemption from certain checks, etc. Fourth section 558 presents an option for user 104 to provide entertainment credentials. The entertainment credentials include, but not limited to, online ticket confirmation (such as an email confirmation or QR code) or physical ticket to sporting events, concerts, etc.

As specified above, user 104 provides vehicle registration and insurance details to government server 108 and insurance server 112. Also, user 104 updates government server 108 and insurance server 112 with vehicle tracking and driver score data (step 306). In one example, user 104 provides DMV information, vehicle registration, proof of insurance, etc. FIG. 7 shows an exemplary interface 600 in which user 104 provides details of each user authorized to operate the vehicle. Further, interface 600 shows insurance coverage details for each user and the vehicle. Here, user 104 updates details of the vehicle such as type of vehicle, Vehicle Identification Number (VIN), year of manufacturer, emission details, model number, name of the manufacturer, transaction type, additional tags, etc. In case of a car dealer/rental company, then dealer add temporary tags for each driver and/or occupants. FIG. 8 shows an exemplary interface 700 presenting vehicle tracking information. Interface 700 shows a route that user 104 currently operating the vehicle took for a period of time. In one example, client device 102 configures to show the route taken by user 104 for a period of past 24 hours. This information allows police 116 to determine user's 104 route took in the past 24 days. FIG. 9 shows an exemplary interface 750 presenting a driver scorecard. In one example, insurance server 112 calculates the driver scorecard based on the user's driving pattern. When needed, client device 102 accesses the information from insurance server 112 and displays the driver scorecard as shown in FIG. 9. Subsequently, client device 102 transmits the information to each of government server 108 and insurance server 112 for storage (step 308).

Figure 11:
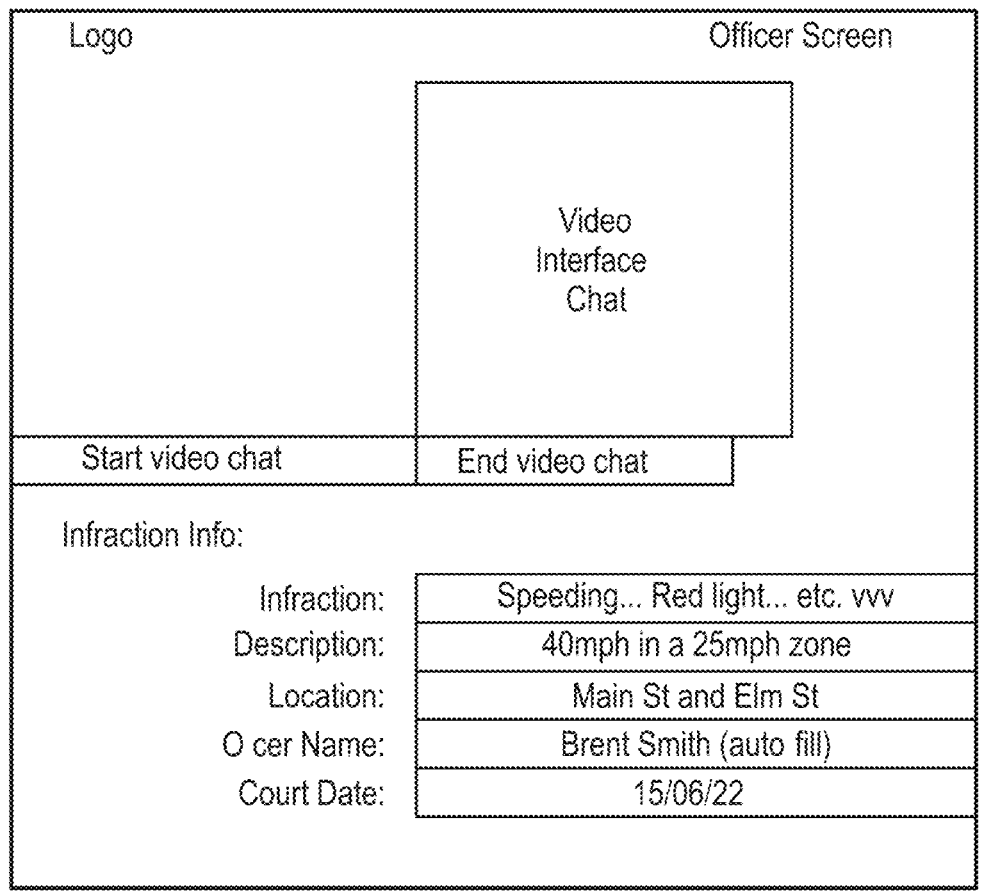

In accordance with the present invention, when law enforcement officer 116 stops user 104, both of them are presented with different interfaces to interact with each other. Here, the interaction is to present user's information to law enforcement officer 116 and law enforcement officer 116 verifying the information and providing required resolution. The required resolution includes, but not limited to, citing a relevant rule violated by user 104, reading out the rights of user 104, presenting the amount of fine to be paid by user 104, Court date to attend to comply with the violation, location of the violation. In another example, if the user 104 has provided sufficient details to law enforcement officer 116 during the encounter/interaction, then law enforcement officer 116 updates the data in each of government server 108, law enforcement server 110, and insurance server 112. FIG. 10 shows an exemplary interface 800 presented to the user on his client device 102 to interact with law enforcement officer 116. As can be seen in exemplary interface 800, once user 104 is stopped, law enforcement officer 116 initiates the interaction either directly or using video interface chat. Here, law enforcement officer 116 may enter a quick read ID to connect to user 104. Upon connecting, law enforcement officer 116 inputs the details of the infraction i.e., the description of why user 104 was stopped, location of the infraction, officer name, his rights, etc. Concurrently, law enforcement officer 116 accesses law enforcement device 114 to update the details depending on the need. FIG. 11 shows exemplary interface 850 presented to law enforcement officer 116, in accordance with one embodiment of the present invention. As can be seen, law enforcement officer 116 updates the information based on any violation of rules. Once law enforcement officer 116 updates the information, the information is transmitted to user 104 on his client device 102, as shown in FIG. 10. Here, law enforcement officer 116 has the ability to dispose of a traffic stop without leaving the vehicle. After law enforcement officer 116 has identified the driver, law enforcement officer 116 provides the reason for the stop and the violation to user 104, i.e., the driver, User 104 confirms agreement to the traffic violation through proper confirmation and attestation in the QRI system, as shown in FIG. 10, for example. Upon 'pleading guilty" to the violation by user 104, law enforcement officer 116 sends a link from "municipal e-payment system" for user 104 to pay within the allotted time frame.

Figure 13:
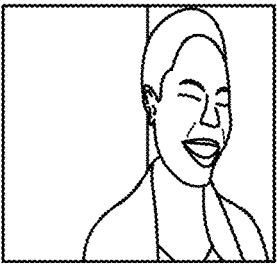

FIG. 12 shows exemplary interface 860 presented to user 104. Here, user 104 updated details of the residents such as name of each person in the family and/or other drivers authorised to drive the vehicle. In addition, user 104 add insurance details for each of the residents and/or drivers authorised to drive the vehicle. In addition, user 104 adds special instructions along with the photographs of any of the residents such as their disabilities, medical conditions, etc. FIG. 13 shows an exemplary interface 870 presented to user 104 to update special instructions along with the photographs, in accordance with one embodiment of the present invention.

In case of user 104 or any of the residents are involved in an accident, then law enforcement officer 116 updates the details of the accident and the details are presented to the user 104 on his user device 102 in real-time. FIG. 14 shows exemplary interface 880 presented to user 104 when involved in an accident. Here, law enforcement officer 116 updates the details of the accident and presents options to user 104 or authorised drivers to accept responsibilities or provide declarations.

Figure 15:
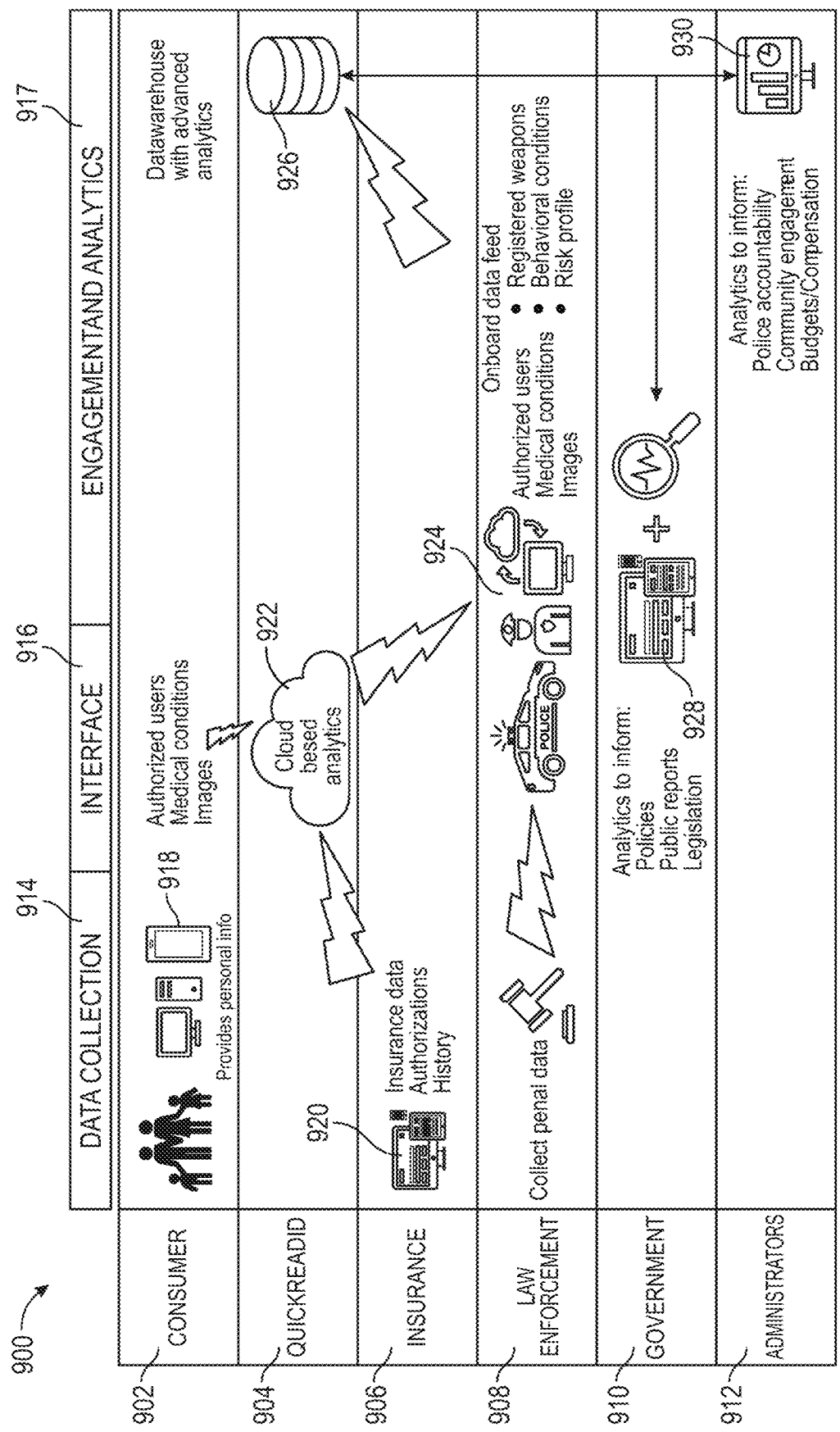
FIG. 15 illustrates information flow between one or more entities, in accordance with one embodiment of the invention.

FIG. 15 shows contextual identity information structure 900, in accordance with one embodiment of the present invention. Contextual identity information structure 900 includes one or more entities such as customer or consumer or user 902. Here, customer 902 subscribes to provide his information to law enforcement officer 116 during law enforcement encounters. As such, customer 902 obtains a unique quick read identification number (QRID) 904. Here, the QRID includes information corresponding to customer 902 or user 902, any associated member, e.g., family member/authorized user, and vehicle associated with customer 902. Contextual identity information structure 900 further includes insurance server 906, law enforcement server 908, government server 910. In one example, contextual identity information structure 900 includes administrators to manage the information. Contextual identity information structure 900 collects data 914 from customer 904. In one example, contextual identity information structure 900 provides interface 916 to customer 904 and his family members to provide and access contextual identity information structure 900. In one example, contextual identity information structure 900 allows a customer or an administrator to generate analytics 917 to manage the data collected and processed in contextual identity information structure 900.

At first, customer 902 provides his information (918) such as name, age, sex, QRID, health information, images, etc., as shown in FIG. 5, for example. Also, customer 902 provides his family members or other users details authorized to operate the vehicle. In one example, customer 902 provides medical conditions of persons authorized to operate the vehicle, as shown in FIG. 6, for example. This way, if any of the authorized persons carry medicines, the data is updated in one of insurance server 906, law enforcement server 908, government server 910. Also, customer 902 uploads images of medicines that authorized users may use to minimize confrontation with the law enforcement officer when he stops them. In one embodiment, insurance server 906 stores data 920 corresponding to customer 902 and any other authorized users. Customer 902 accesses the information 922 when he needs to check status. The information is stored in database 926 such that upon entering QRID 904 corresponding to customer 902 or other authorized users, a law enforcement officer 924 will be able to access the information. Further, when law enforcement officer 924 stops any person driving the vehicle, he accesses data (918 and 922) stored in database 926. In addition, the law enforcement officer accesses government server 910 for legislation or policies (928) to deal with any situation without confronting the person driving the vehicle, as shown in FIG. 11, for example. Any action taken by law enforcement officer 924 gets stored in database 926. The data allows to check whether law enforcement officer 924 has used excessive force while dealing with a person in the vehicle. This also allows the government to take necessary steps to reduce or minimize confrontations by law enforcement officers and/or people during law enforcement encounters.

Figure 16:
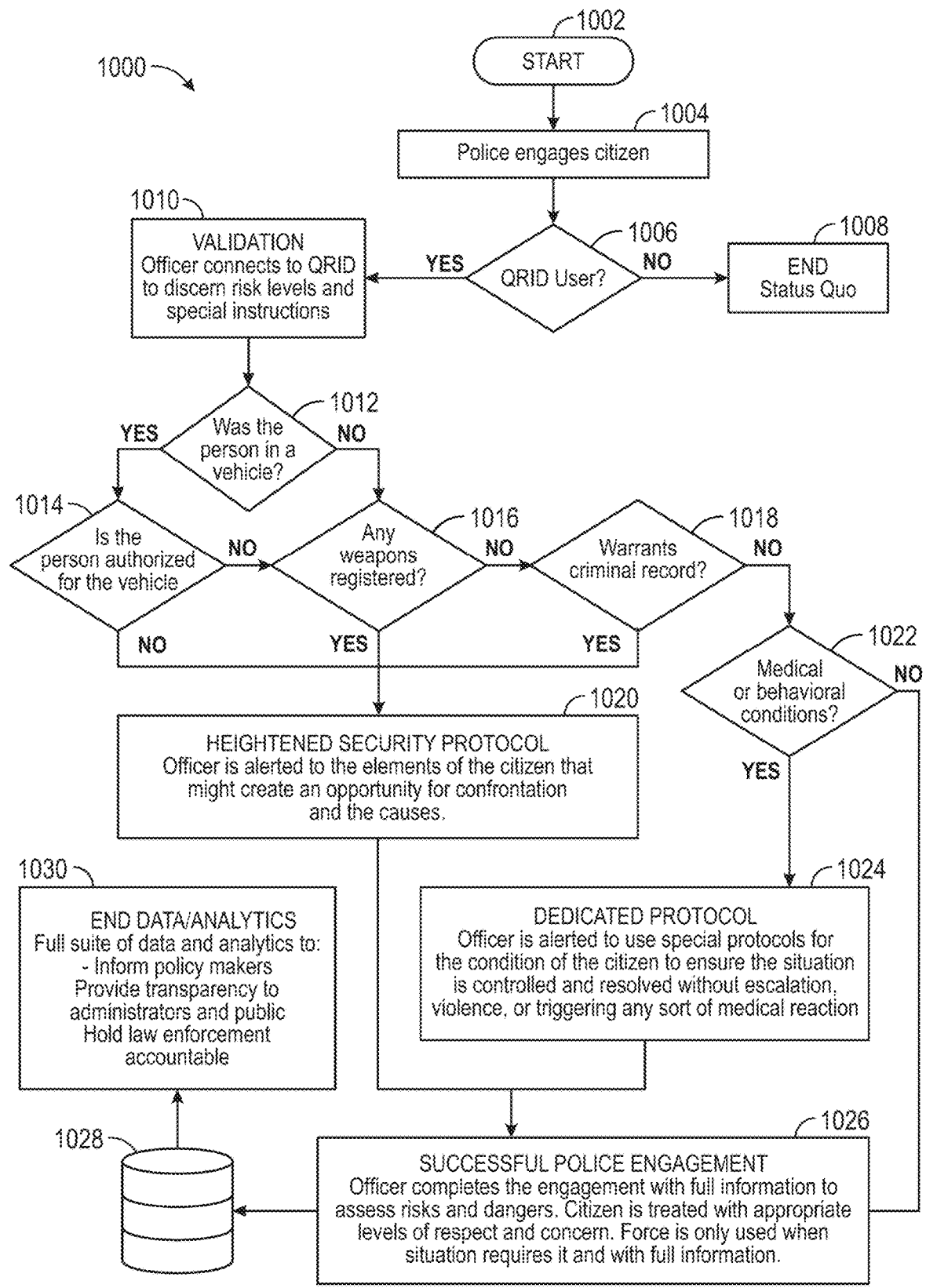
FIG. 16 illustrates a method of accessing contextual identity information during law enforcement encounters by a law enforcement officer using a law enforcement device, in accordance with one embodiment of the invention.

FIG. 16 shows method 1000 of verifying the details of the user and the vehicle by a law enforcement officer using a quick read unique identification number (QRID) generated for customer and other users to operate the vehicle, in accordance with one exemplary embodiment of the present invention. The order in which method 1000 is described should not be construed as a limitation, and any number of the described method blocks can be combined in any order to implement method 1000 or alternate methods. Additionally, individual blocks may be deleted from method 1000 without departing from the spirit and scope of the invention described herein. Furthermore, method 1000 can be implemented in any suitable hardware, software, firmware, or combination thereof. However, for ease of explanation, in the embodiments described below, method 1000 may be implemented using law enforcement device 116 (also 924).

A person skilled in the art understands that a law enforcement officer uses a law enforcement device to verify the details of the user and/or vehicle when the law enforcement officer stops the user's vehicle at the side of the road. In one example, the law enforcement officer may stop the user on suspicion of vehicle theft. In another example, the law enforcement officer may stop a user on suspicion of driving without proper documentation, say insurance or license. In another example, a law enforcement officer may stop a user on a routine check. In another example, a law enforcement officer may stop a user for driving in the wrong direction or for violating traffic rules. A person skilled in the art understands that a law enforcement officer may stop a user for any other reason.

Method 1000 starts at step 1002. At step 1004, a law enforcement officer stops and engages a citizen or user. Here, the law enforcement officer checks if the citizen has QRID (QRID) (1006). If the citizen does not have QRID, then method 1000 ends and the law enforcement officer follows the traditional method of dealing with the citizen (step 1008). If the citizen has QRID, method 1000 proceeds to step 1010. At step 1010, the law enforcement officer connects to QRID to discern the risk level posed by the citizen or any special instructions provided for the specific citizen. At step 1012, the law enforcement officer checks if the citizen having QRID is the same person in the vehicle (step 1012). If yes, then the law enforcement officer checks whether the person is authorized for the vehicle (step 1014). If the person is not authorized for the vehicle, then method 1000 moves to steps 1016 and 1020. If at step 1012, it is determined that the citizen is not the person as identified based on the QRID, then method 1000 moves to step 1016. At step 1016, the law enforcement officer checks if a weapon is registered for the person in the vehicle. If yes (1016), then method 1000 moves to step 1020. If not (1016), then method 1000 moves to step 1018. In one example, law enforcement officer enters one of name of the user, vehicle number or QRID. Upon receiving the query, law enforcement device 116 parses the query and searches database 926. The query is searched to identify any record (criminal record, traffic violation in user's name, vehicle information such as vehicle stolen data or speeding information or any other relevant information).

At step 1018, the law enforcement officer checks if the person warrants a criminal record. If yes (1018), the method 1000 moves to step 1020. At step 1020, the law enforcement officer is alerted to the elements of the citizen that might create an opportunity for confrontation and the possible causes.

If there is no criminal record (step 1018), then the citizen's medical or behavioural conditions are checked at step 1022. If the citizen has medical or behavioural conditions, then the law enforcement officer is alerted to use special protocols (predefined protocols) based on the condition of the citizen to ensure the situation is controlled and resolved without escalation, violence, or triggering any sort of medical reaction (step 1024). If there are medical conditions (step 1022) or upon alerting the law enforcement officer to deal with the situation, then method 1000 moves to step 1026. At step 1026, the law enforcement officer completes the engagement with full information to assess risks and dangers. The law enforcement officer treats the person with appropriate levels of respect and concern (predefined protocols). For example, the predefined protocols include, but not limited to, prominently displaying all the relevant information required to user/customer or associated member, following stipulated guidelines on arrests, and the details regarding the persons arrested, dealing the customer with respect to the human rights of the people, and protection of their civil, political, social, economic and cultural rights. Here, the law enforcement officer uses force only when the situation requires and with full information thereby minimizing the confrontational tensions with the citizen. The information corresponding to how the law enforcement officer dealt with the person is stored in a database (step 1028). The method 1000 ends at step 1030 where reports or analytics (number of users/vehicles checked, number of arrests made, amount of fines collected, etc.) are generated/prepared to inform policy makers to enact new legislation or modify existing laws. The analytics provide transparency to administrators and the public. If it is determined that the law enforcement officer acted inappropriately, then the law enforcement officer may be held accountable for causing confrontational tension with the citizen.

Based on the above, it is evident that the presently disclosed system provides the information to the law enforcement officer and allows to reduce potentially hostile situations, by putting the law enforcement official at ease. The system provides complete information about the users to the law enforcement official and helps to reduce the initial confrontational tension between the law enforcement officer and the users. This results in the users or driver's likelihood of putting the law enforcement official in a potentially dangerous situation. Further, this causes the law enforcement official to be less likely to harm the users/drivers.

The present invention has been described in particular detail with respect to various possible embodiments, and those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of the above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, should be understood as being implemented by computer programs.

Further, certain aspects of the present invention include process steps and instructions described herein in the form of an algorithm. It should be noted that the process steps and instructions of the present invention could be embodied in software, firmware, or hardware, and when embodied in software, could be downloaded to reside on and be operated from different platforms used by real-time network operating systems.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. Also, the present invention is not described with reference to any particular programming language. It is appreciated that a variety of programming languages may be used to implement the teachings of the present invention as described herein, and any references to specific languages are provided for disclosure of enablement and best mode of the present invention.

It should be understood that components shown in FIGUREs are provided for illustrative purposes only and should not be construed in a limited sense. A person skilled in the art will appreciate alternate components that may be used to implement the embodiments of the present invention and such implementations will be within the scope of the present invention.

While preferred embodiments have been described above and illustrated in the accompanying drawings, it will be evident to those skilled in the art that modifications may be made without departing from this invention. Such modifications are considered as possible variants included in the scope of the invention.

What is claimed is:

1. A method of accessing and using contextual identify information during a law enforcement encounter, the method comprising the steps of:
   receiving, by a processor, information corresponding to a user or an associated member of the user, a vehicle associated with the user, and data of the user or the associated member authorized to drive the vehicle;
   generating, by the processor, a quick read identification number (QRID) based on the information of the user or the associated member, the vehicle, and the data of the user or the associated member authorized to drive the vehicle;
   receiving, by the processor, a query during a law enforcement encounter, the query comprising the information corresponding to the user or the associated member, and the vehicle;
   parsing, by the processor, the query for searching a pre-stored database;
   identifying, by the processor, the QRID in the pre-stored database corresponding to the user or the associated member, or the vehicle;
   verifying, by the processor, whether the QRID matches with the user or the associated member, and the vehicle;
   checking, by the processor, whether the user or the associated member using the vehicle having a pending violation; and
   allowing, by the processor, the user or the associated member to proceed when the QRID received matches with the QRID generated and when the user or the associated member has no pending violation.

2. The method of claim 1, further comprising alerting, by the processor, law enforcement officer upon identifying the pending violation on the user or the associated member.

3. The method of claim 1, further comprising alerting, by the processor, law enforcement officer upon failure of verification of the user or the associated member with the vehicle.

4. The method of claim 1, further comprising updating, by the processor, medical or behavioural conditions of the user or the associated member.

5. The method of claim 4, further comprising alerting, by the processor, law enforcement officer for implementing predefined protocols upon identifying the user or associated member having the medical or behavioural conditions.

6. The method of claim 1, further comprising generating, by the processor, reports of number of users or associated members checked.

7. The method of claim 3, further comprising transmitting, by the processor, the alert to one of a government server, a law enforcement server, and an insurance server.

8. The method of claim 1, further comprising tracking, by the processor, a travel path taken by the user or the associated member using the vehicle.

9. A system for accessing and using contextual identify information during a law enforcement encounter, the system comprising:
   a processor; and
   a memory coupled to the processor, wherein the memory stores program instructions executed by the processor, to:
      receive information corresponding to a user, an associated member of the user, a vehicle associated with the user, and data of the user or the associated member authorized to drive the vehicle;
      generate a quick read identification number (QRID) based on the information of the user, the associated member the vehicle, and the data of the user or the associated member authorized to drive the vehicle;
      receive a query during a law enforcement encounter, wherein the query comprises the information corresponding to the user or the associated member, or the vehicle;
      parse the query for searching a pre-stored database;
      identify the QRID in the pre-stored database corresponding to user or the associated member, or the vehicle;
      verify whether the QRID matches with the user or the associated member, and the vehicle;
      check whether the user or the associated member using the vehicle having a pending violation; and
      allow the user or the associated member to proceed when the QRID received matches with the QRID generated and when the user or the associated member has no pending violation.

10. The system of claim 9, wherein the processor executes the program instructions to alert law enforcement officer upon identifying the pending violation on the user or the associated member.

11. The system of claim 9, wherein the processor executes the program instructions to alert law enforcement officer upon failure of verification of the user or the associated member with the vehicle.

12. The system of claim 9, wherein the processor executes the program instructions to transmit the alert to one of a government server, a law enforcement server, and an insurance server.

13. The system of claim 12, wherein the insurance server stores information corresponding to an insurer, identification details of the vehicle, validity of the insurance, health information of the user or the associated member.

14. The system of claim 12, wherein the government server stores information corresponding to the vehicle.

15. The system of claim 12, wherein law enforcement server stores information corresponding to crime records, traffic offences, and law violation records of the user or the associated member and the vehicle.

16. The system of claim 9, wherein the processor executes the program instructions to update medical or behavioural conditions of the user or the associated member.

17. The system of claim 16, wherein the processor executes the program instructions to alert law enforcement officer for implementing predefined protocols upon identifying the user or associated member having the medical or behavioural conditions.

18. The system of claim 16, wherein the processor executes the program instructions to track a travel path taken by the user or the associated member using the vehicle.

19. The system of claim 16, wherein the processor executes the program instructions to generate reports of number of users or the associated members checked.

20. A non-transitory, computer-readable medium storing instructions that, when executed by a computer system for accessing and using contextual identify information during a law enforcement encounter, configure the computer system for:
   receiving information corresponding to a user or an associated member of the user, a vehicle associated with the user, and data of the user or the associated member authorized to drive the vehicle;
   generating a quick read identification number (QRID) based on the information of the user or the associated member, the vehicle, and the data of the user or the associated member authorized to drive the vehicle;

receiving a query during a law enforcement encounter, the query comprising the information corresponding to the user or the associated member, or the vehicle;
parsing the query for searching a pre-stored database;
identifying the QRID in the pre-stored database corresponding to the user or the associated member, or the vehicle;
verifying whether the QRID matches with the user or the associated member, and the vehicle;
checking whether the user or the associated member using the vehicle having a pending violation; and
allowing the user or the associated member to proceed when the QRID received matches with the QRID generated and when the user or the associated member has no pending violation.

* * * * *